United States Patent

Utz et al.

[11] Patent Number: 5,415,467
[45] Date of Patent: May 16, 1995

[54] AUTOMATIC STANDSTILL BRAKE FOR A MOTOR VEHICLE EQUIPPED WITH AN AUTOMATIC TRANSMISSION

[75] Inventors: Hermann Utz, Ettlingen; Stefan Witte, Karlsruhe, both of Germany

[73] Assignee: Robert Bosch GmbH, Stuttgart, Germany

[21] Appl. No.: 139,814

[22] Filed: Oct. 22, 1993

[30] Foreign Application Priority Data

Oct. 27, 1992 [DE] Germany ............... 42 36 240.7

[51] Int. Cl.⁶ .................... B60T 7/12; F16H 63/48
[52] U.S. Cl. ................................. 303/89; 188/265
[58] Field of Search ............. 303/89, 24.1, 113.2, 303/95; 188/110, 265; 180/170

[56] References Cited

U.S. PATENT DOCUMENTS

| | | | |
|---|---|---|---|
| 2,272,320 | 2/1942 | Freeman | 188/265 X |
| 3,233,153 | 2/1966 | Ryan | 303/95 X |
| 3,498,426 | 3/1970 | Nakano | 192/13 R |
| 3,684,049 | 8/1972 | Kimura | 303/24.1 X |
| 5,011,238 | 4/1991 | Brown, Jr. | 303/113.2 |
| 5,013,094 | 5/1991 | Nishii et al. | 303/113.2 X |

Primary Examiner—Robert J. Oberleitner
Assistant Examiner—Peter M. Poon
Attorney, Agent, or Firm—Walter Ottesen

[57] ABSTRACT

The invention is directed to an automatic standstill brake for motor vehicles equipped with an automatic transmission wherein a braking pressure is generated at the wheel-brake cylinders via devices operating on the brake circuit of the motor vehicle. The automatic standstill brake prevents a rolling of the motor vehicle when at standstill. The standstill brake operates when the motor vehicle has come to standstill and the driver has released the brake pedal so that it goes into its rest position. The standstill brake includes a computer which provides an output for a signal transmitter which supplies an actuating signal which, in turn, is applied to the devices operating on the brake circuit thereby causing the standstill brake to become engaged or disengaged. The computer forms the output thereof from the input signal of a sensor for the actual speed of the motor vehicle, an input signal of a sensor for the actuation of the brake pedal and an input signal of a sensor for the actuation of the accelerator pedal.

5 Claims, 1 Drawing Sheet

AUTOMATIC STANDSTILL BRAKE FOR A MOTOR VEHICLE EQUIPPED WITH AN AUTOMATIC TRANSMISSION

FIELD OF THE IVNENTION

The invention relates to an automatic standstill brake for a motor vehicle equipped with an automatic transmission and includeS devices for operating on the brake circuit of the motor vehicle. These devices apply a brake pressure to the wheel brake cylinders.

BACKGROUND OF THE INVENTION

It is known that the driver of a motor vehicle equipped with an automatic transmission must continuously actuate the brakes after the driver brings the vehicle to standstill with the motor running such as when driving up to an intersection or during a traffic jam. Otherwise, a slow unwanted movement of the motor vehicle is unavoidable.

A continuous actuation of the brakes brings with it a danger of fatigue on the part of the driver as well as an unsafe condition when the brakes are inadvertently released while the vehicle is at standstill. These situations can occur especially during longer standstill periods.

SUMMARY OF THE INVENTION

For a motor vehicle equipped with an automatic transmission, it is an object of the invention to provide an automatic standstill brake for which the brake pedal of the vehicle brake system must not be continuously actuated when the motor vehicle is at standstill thereby providing improved driving comfort.

The automatic standstill brake of the invention is for a motor vehicle equipped with an automatic transmission, an accelerator pedal and a brake circuit including a brake pedal and a plurality of wheel brake cylinders. The automatic standstill brake of the invention includes the following: operating means for operating on the brake circuit to apply a brake pressure to the wheel brake cylinders whereby the standstill brake is in an engaged state and for removing the brake pressure whereby the standstill brake is in a disengaged state; a first sensor for supplying a first signal indicative of the road speed of the motor vehicle; a second sensor for supplying a second signal indicative of the actuation of the brake pedal; a third sensor for supplying a third signal indicative of the actuation of the accelerator pedal; computer means for receiving the first, second and third signals as input signals and for processing the signals to produce an output indicative of the desired state of the standstill brake; and, a signal transmitter for transmitting an actuating signal to the operating means corresponding to the output of the computer means.

It has been shown that when available data concerning the actual driving situation are converted into input signals for a vehicle computer, the computer provides an output which can be utilized for actuating a device acting temporarily on the brake circuit of the motor vehicle.

With this output, it is especially advantageously possible to maintain the brakes of a motor vehicle in the activated state without the driver continuously holding the brake pedal depressed.

It has been further determined that the braking function of the automatic standstill brake can be automatically cancelled so that the motor vehicle is in its normal operating condition by means of inputting a further control signal which can be initiated, for example, with the actuation of the accelerator pedal.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
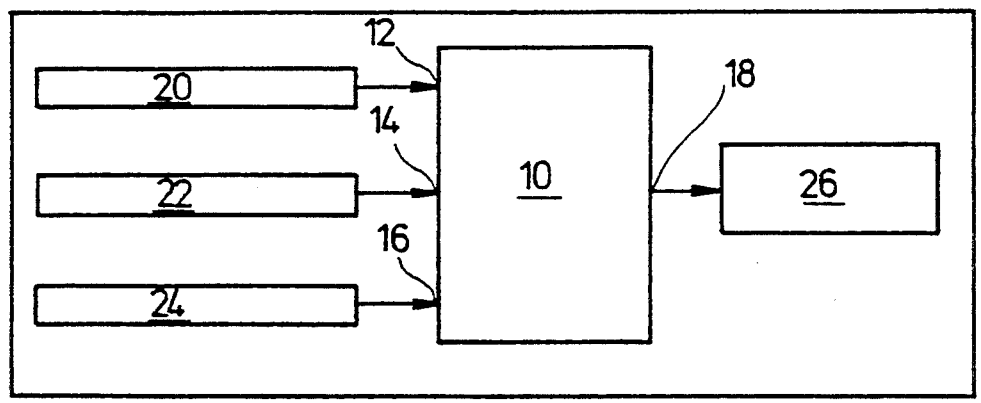
FIG. 1 is a block circuit diagram for forming a signal for an automatic standstill brake according to the invention.

Referring to FIG. 1, a computer 10 has input terminals 12, 14 and 16 as well as an output terminal 18. The signal of a road-speed sensor 20 is applied to terminal 12 with this signal being a variable indicative of the actual road speed. The input terminal 14 is connected to a sensor 22 which supplies a signal in dependence upon the position of the brake pedal. The input terminal 16 is connected to a sensor 24 which supplies a signal in dependence upon the position of the accelerator pedal. The output terminal 18 of the computer 10 leads to a signal transmitter 26.

The operation of the circuit will now be described.

The computer 10 determines the standstill brake signal variable for the signal transmitter 26 which indicates whether the standstill brake is to be activated or not. This standstill brake signal output variable is determined from the input variable v_act of sensor 20, the brake-pedal signal variable of sensor 22 and the accelerator-pedal signal variable of sensor 24.

The variable v_act is indicative of the road speed of the motor vehicle which can, for example, be taken from the ABS wheel rpm.

The brake-pedal signal variable indicates that the driver has actuated the brake. This value can either be determined with a potentiometer which detects the brake pedal position or the brake light switch can be used as an indicator as to whether the driver has actuated the brake or not.

The accelerator-pedal signal variable indicates whether the driver has actuated the accelerator pedal. This data can be detected, for example, with a potentiometer at the accelerator pedal (available for motor vehicles having EGAS) or the position of the throttle flap can be used as the basis of the signal. The computer determines the actuating signal for the standstill brake from these input variables. The EGAS-system pertains to a configuration wherein, for example, the connection from the accelerator pedal to the throttle flap of the engine is not mechanical but is via an electronic circuit so that the throttle flap is actuated electrically.

The signal obtained with the circuit shown in FIG. 1 for the standstill brake (that is, standstill brake "in" or standstill brake "out") is now applied directly to devices which trigger the braking operation. The standstill brake signal "in" can be applied with a time delay.

Figure 2:
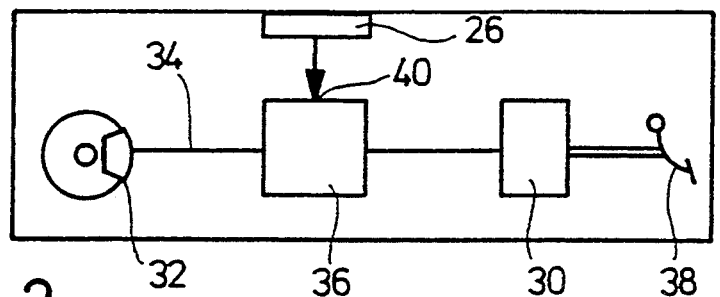
FIG. 2 is a schematic of an embodiment of the automatic standstill brake of the invention; and, FIG. 3 is an embodiment of an electronically drivable brake with which the automatic standstill brake of the invention is realized.
Figure 3:
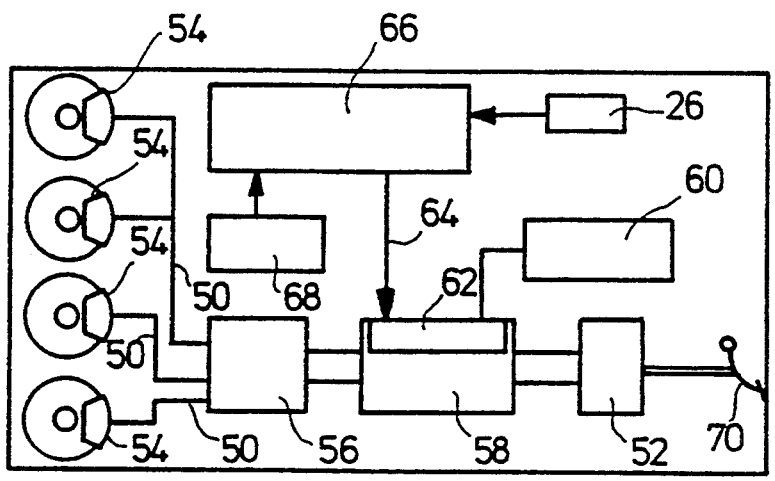

Possible realizations of devices for operating on the brake circuit of the motor vehicle in response to the signals received from signal transmitter 26 are shown in FIGS. 2 and 3.

In FIG. 2, a magnetic valve 36 is mounted in the brake line 34 leading from the primary brake cylinder 30 to the wheel brake cylinder 32. The primary brake cylinder 30 is operatively connected to a brake pedal 38. The magnetic valve 36 has an input terminal 40 for the signal formed by the signal transmitter 26.

The magnetic valve 36 is introduced into the brake line 34 between the primary brake cylinder 30 and the wheel brake cylinder 32. The magnetic valve 36 is closed (standstill-brake signal variable =1) or opened (standstill-brake signal variable =0) in dependence upon the state of the standstill-brake signal variable of the signal transmitter 26.

If the driver of the motor vehicle has braked the motor vehicle down to standstill, then the driver applies a certain brake pressure to the wheels via the primary brake cylinder 30. If the standstill-brake signal variable of the signal transmitter 26 now assumes the value 1, then the magnetic valve 36 is closed and no reduction in pressure at the wheel brake cylinder 32 can take place with this being the case even when the driver releases the brake pedal. In this way, a standstill brake is provided which takes over the braking pressure of the driver. As soon as the standstill-brake signal variable assumes the value zero, the magnetic valve 36 is again opened and the standstill brake is disengaged. With the magnetic valve 36 utilized, the driver must, however, be able to disengage the standstill-brake pressure then adjusted even when the magnetic valve 36 is closed.

In FIG. 3, the utilization of the automatic standstill brake is shown in combination with an electronically drivable brake.

The brake lines 50 connect the primary brake cylinder 52 to the wheel brake cylinders 54. In these brake lines 50, the ABS-system 56 is integrated on the one hand and a plunger 58 for each brake circuit is integrated on the other hand. The plunger 58 is connected to a pressure supply system 60 and to the primary brake cylinder 52. In addition, the plunger 58 has respective magnetic valves 62 which are driven by the control apparatus 66 via a control line 64. The control apparatus includes input terminals for sensors 68 and for the signal transmitter 26. The primary brake cylinder 52 is operatively connected to a brake pedal 70.

The sensors 68 provide data as to the operating condition of the motor vehicle. For example, the sensors can detect blocking of a wheel for the ABS-system 56 and ensure the correct operation of the latter.

The motor vehicle is equipped with an electronically controlled brake system which can adjust a brake pressure applied to the wheels in addition to the pressure set by the driver.

The control apparatus 66 receives the operating state which the brakes should assume from a primary system such as the signal transmitter 26. The states "standstill brake" and "passive" are here relevant operating states.

In the state "standstill brake", the magnetic valves 62 are driven by the control apparatus 66 such that, with the aid of pressure supply 60, a constant brake pressure is adjusted at the wheels of the motor vehicle. The plunger 58 (for each brake circuit) ensures that the maximum of the pressure set by the driver via the primary brake cylinder 52 and of the pressure set by the control apparatus 66 via the magnetic valves 62 is available at the output of the plunger 58.

In the passive state, the magnetic valves 62 are adjusted for pressure reduction by control apparatus 66 so that the pressure of the pressure supply 60 cannot be transmitted via the plunger 58. The motor vehicle is then braked by the driver via the primary brake cylinder 52.

These two states (standstill brake and passive) are adjusted in dependence upon the standstill brake signal variable of the signal transmitter 26.

According to another embodiment of the invention, the signal transmitter 26 can be configured to include a time-delay circuit for delaying the application of the signal variable which engages the automatic standstill brake. A typical time delay introduced by the time-delay circuit could be two to three seconds. Thus, when the driver of the motor vehicle has held the brake pedal down for two to three seconds (after having brought the vehicle to standstill), the automatic standstill brake is then engaged.

It is understood that the foregoing description is that of the preferred embodiments of the invention and that various changes and modifications may be made thereto without departing from the spirit and scope of the invention as defined in the appended claims.

What is claimed is:

1. An automatic standstill brake for a motor vehicle equipped with an automatic transmission, an accelerator pedal and a brake circuit including a brake pedal and a plurality of wheel brake cylinders, the automatic standstill brake comprising:

operating means for operating on said brake circuit to apply a brake pressure to said wheel brake cylinders whereby said standstill brake is in an engaged state and for removing said brake pressure whereby said standstill brake is in a disengaged state;

a first sensor for supplying a first signal indicative of a road speed of the motor vehicle;

a second sensor for supplying a second signal indicative of an actuation of the brake pedal;

a third sensor for supplying a third signal indicative of an actuation of the accelerator pedal;

computer means for receiving said first, second and third signals as input signals and for processing said signals to produce an output indicative of the desired state of said standstill brake;

a signal transmitter for transmitting an actuating signal to said operating means corresponding to said output;

said brake circuit further including a primary brake cylinder actuable by said brake pedal and a plurality of brake lines connecting said primary brake cylinder to corresponding ones of said wheel brake cylinders;

a plurality of plungers arranged in corresponding ones of said brake lines;

an ancillary pressure supply system connected to said plungers;

said operating means including a plurality of magnetic valves corresponding to said plungers, respectively;

a control apparatus for driving said magnetic valves;

said control apparatus having an input connected to said signal transmitter; and, said actuating signal having a first value for driving said magnetic valves via said control apparatus so as to cause a braking pressure from said ancillary pressure supply system to build up and a second value for driving said magnetic valves so as to cause said braking pressure from said ancillary pressure supply system to reduce.

2. The automatic standstill brake of claim 1, further include an ABS-system arranged in each of said brake lines.

3. The automatic standstill brake of claim 2, said input of said control apparatus being a first input and said control apparatus having a second input; and, sensor means for detecting blocking of a wheel and said sensor means being connected to said second input.

4. The automatic standstill brake of claim 1, said signal transmitter including time-delay means for delaying the application of said first value of said actuating signal for a predetermined time span.

5. The automatic standstill brake of claim 4, said predetermined time span being two to three seconds.

* * * * *